United States Patent [19]

Bright

[11] Patent Number: 4,699,837

[45] Date of Patent: Oct. 13, 1987

[54] SEALING OR FINISHING STRIPS AND CARRIERS THEREFOR

[75] Inventor: Robert G. Bright, Viersen, Fed. Rep. of Germany

[73] Assignee: Draftex Industries Limited, Edinburgh, Scotland

[21] Appl. No.: 823,795

[22] Filed: Jan. 29, 1986

[30] Foreign Application Priority Data

Feb. 1, 1985 [GB] United Kingdom ............... 8502652

[51] Int. Cl.$^4$ .................. B32B 3/04; E04F 19/02
[52] U.S. Cl. ........................... 428/122; 49/491; 52/716; 264/177.2; 425/114; 428/256; 428/358
[58] Field of Search ............ 428/31, 122, 358, 364, 428/368, 369, 373–375, 256; 49/490, 491; 425/114; 52/716; 264/177.2, 174

[56] References Cited

U.S. PATENT DOCUMENTS

| | | | |
|---|---|---|---|
| 2,070,624 | 2/1937 | Schlegel | 428/122 X |
| 2,191,549 | 2/1940 | Spraragen | 428/358 X |
| 3,198,689 | 8/1965 | Lansing | 49/490 X |
| 4,107,898 | 8/1978 | Andrzejewski et al. | 428/122 X |
| 4,304,816 | 12/1981 | Bright et al. | 49/490 X |
| 4,343,845 | 8/1982 | Burden et al. | 49/490 X |
| 4,381,273 | 4/1983 | Azzola | 428/358 X |
| 4,413,033 | 11/1983 | Weichman | 428/358 X |
| 4,430,373 | 2/1984 | Hammarberg | 428/369 X |
| 4,517,233 | 5/1985 | Weichman | 428/358 X |
| 4,610,907 | 9/1986 | Elvira | 428/358 X |

FOREIGN PATENT DOCUMENTS 2386762  12/1978  France .................. 52/716

*Primary Examiner*—Richard L. Chiesa
*Attorney, Agent, or Firm*—Leydig, Voit & Mayer

[57] ABSTRACT

A carrier for a channel-shaped trimming or sealing strip is manufactured by leading a main wire between meshing teeth so as to give the wire a zig-zag configuration. The emerging wire is pushed between guide walls. Simultaneously, looped edge wires are fed in, along the walls, and mesh with the ends of the loops of the main wire. The meshed wires are fed into the mouth of a cross-head extruder. This extrudes plastics or rubber material around the meshed wires so as to hold them in meshing engagement. The resultant generally flat strip can then be bent into channel-shape.

8 Claims, 11 Drawing Figures

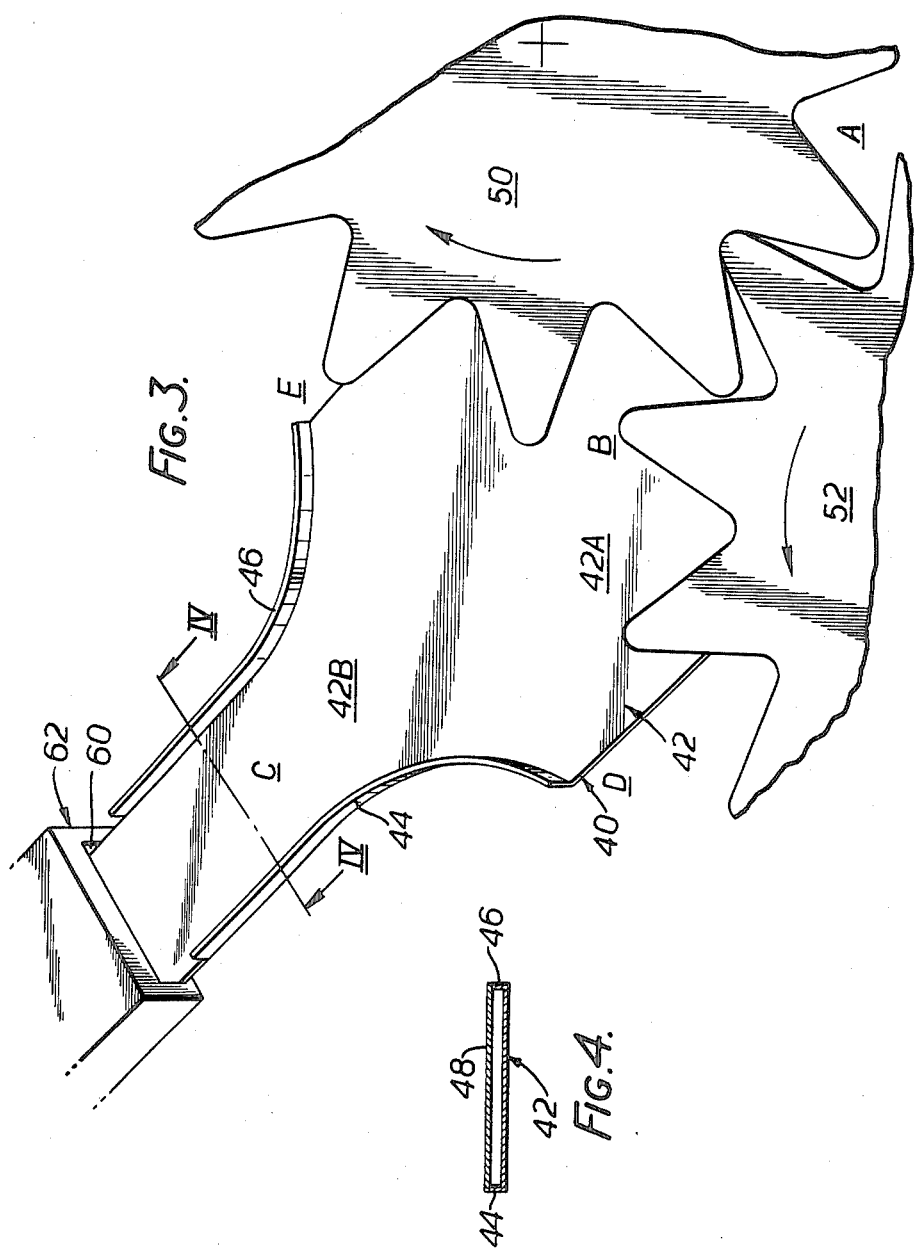

SEALING OR FINISHING STRIPS AND CARRIERS THEREFOR

BACKGROUND OF THE INVENTION

The invention relates to cores or carriers for incorporation in sealing or trimming strips and to such strips incorporating such cores or carriers. Such strips may be used, for example, for sealing and/or trimming around openings such as door or luggage compartment openings in motor vehicle bodies.

Such strips may be of channel-shaped form for embracing and mounting on a flanged joint running around such an opening. The channel may support a sealing part which seals against a closure member for the opening, such as a vehicle door. It is known to incorporate cores or carriers within the channel-shaped form. Such carriers may be made of metal, for example, and may themselves be in channel-shaped form and embedded within extruded plastics or rubber material. Such carriers improve the strength, resilience and gripping capabilities of the channel-shaped form.

BRIEF SUMMARY OF THE INVENTION

According to the invention, there is provided a core or carrier, comprising a first wire looped to and fro with a predetermined pitch between notional lines extending alongside each other and spaced apart by a predetermined distance, and at least one second wire which is looped with substantially the same predetermined pitch, has an amplitude substantially less than the spacing between the two notional lines and is positioned along one of the said notional lines so as to be in meshing engagement there with the loops of the first wire.

According to the invention, there is further provided a core or carrier of channel-shape configuration so as to have substantially parallel spaced-apart edges defining the channel opening, comprising a first wire which extends continuously along the length of the channel and is looped to and fro to form a plurality of generally U-shaped elements arranged side-by-side along the length of the channel and interconnected by the reversals of direction in the loops in the successive loops, the reversals of direction being spaced apart from each other with predetermined pitch along the length of each said edge, and at least one second wire which is of looped configuration of the said predetermined pitch but having a loop amplitude substantially less than the amplitude of each loop of the first wire, the said second wire running along the length of a respective said edge and being in meshing engagement with the said reversals of direction of the first wire along that edge.

According to the invention, there is also provided a method of making a core or carrier, comprising the steps of bending a first wire into looped configuration to and fro between notional lines extending alongside each other and spaced apart by a predetermined distance so that the loops of the wire have a predetermined pitch, and positioning at least one second wire along a respective one of the said lines so as to be in meshing engagement there with the first wire, the second wire being of looped configuration with its loops of substantially the same said pitch but having a loop amplitude substantially less than the distance between the said lines.

According to the invention, there is still further provided apparatus for carrying out the above-mentioned method, comprising guide means defining a substantially planar surface having two spaced apart wall means running therealong, the wall means being spaced apart by a distance corresponding to the spacing between the said notional lines, the wall means defining a passageway having upstream and downstream openings, and drive means mounted upstream of the upstream opening of the guide means for receiving wire of zig-zag configuration and pushing it between the said wall means so as to close it up into the looped configuration.

DESCRIPTION OF THE DRAWINGS

Carriers embodying the invention, methods according to the invention of making carriers, apparatus according to the invention for making carriers and sealing strips embodying the invention, will now be described, by way of example only, with reference to the accompanying drawings in which:

FIG. 3 shows in perspective view, with certain parts removed to aid clarity, apparatus embodying the invention for manufacturing the carrier;

FIG. 4 is a section on the line IV—IV of FIG. 3;

DESCRIPTION OF PREFERRED EMBODIMENTS

Figure 7:
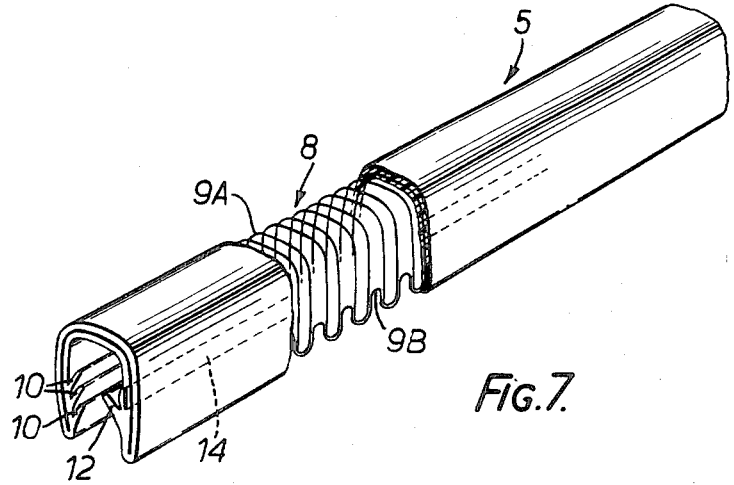
FIG. 7 is a perspective view of the strip produced by bending the form shown in FIG. 6 into channel-shape, part of the covering material being removed to render the carrier visible.

FIG. 7 shows a channel-shaped strip 5. This is made of extruded plastics or rubber material 6 which completely encloses a carrier 8. The carrier and its method of manufacture will be described in more detail below. As is shown in FIG. 7, the carrier is made of looped wire 9, preferably metal wire.

The extruded material 6 is extruded so as to produce gripping lips 10,12.

In use, the strip 5 may be mounted around an opening to be trimmed or sealed. More particularly, the strip 5 may be mounted on the flanged joint which runs around a door or luggage compartment opening in a motor vehicle body, so as to cover the flanged joint. The strip 5 is held in position on the flanged joint by the resilience imparted to the strip by the carrier 8 and by the gripping function carried out by the gripping lips 10,12.

In FIG. 7, three relatively small gripping lips are shown on one inside wall of the channel with one relatively larger gripping lip on the opposite side.

However, other arrangements of gripping lips may be used instead.

Advantageously, the strip carries a sealing portion (not shown) attached to and running along one outside side wall of the channel. The sealing portion is advantageously made of softer material than the material 6 such as sponge rubber and may be of hollow tubular construction or in the form of a lip. The strip 5 is so positioned on the flanged joint that the sealing portion runs around the periphery of the opening so as to come into sealing contact with the door for the opening when it closes. The sealing portion may be produced separately and attached to the strip 5 by means of adhesive. In such a case, the extruded material 6 may be plastics for example, and the sealing portion may be made of rubber. Instead, however, the material 6 and the material of the sealing portion may be extruded simultaneously by a duplex extrusion process. This process may be arranged so that the channel-shaped extruded material 6 is harder than the extruded material of the sealing portion; rubber may be used.

As shown in FIG. 7, a tape 14 may be embedded within the extruded material 6 so as to run longitudinally along the length of the strip. This tape 14 may be made of substantially inextensible polyester or similar material, or may be in the form of a metal wire. Its purpose is to resist tensile forces applied longitudinally of the strip such as during manufacture and/or during the process of fitting the strip on to the flanged joint. The tape 14 need not be positioned in the manner shown in FIG. 7 but may be positioned elsewhere in relation to the strip. There may be more than one such tape, or none.

The manner of manufacture of the carrier 8 will now be described.

As stated above, the carrier is made of looped wire, preferably metal wire. The carrier 8 is in fact constructed from three separate lengths of wire, a main wire 9A and two "edge wires" 9B and 9C. Supplies of the three wires are supplied from respective rolls or drums. Each of the wires is required to have a square or rectangular cross-section. The wires may be supplied in that form (that is, stored on their respective rolls or drums in that form). If, as is more likely, they are of circular cross-section, each wire is led off its respective roll or drum and subjected to an initial process (such as by passing it between suitably positioned pairs of rollers) to form it into square or rectangular cross-section. Desirably, each wire has a square cross-section in the form of a square having a side of 0.6 to 0.7 millimeters.

Figure 1:
FIGS. 1 and 2 show wires at a preliminary stage in the method.

The main wire 9A is then subjected to a continuous process to form spaced kinks or bends in it so that it has the form shown in FIG. 1, the kinks or bends being at equally spaced intervals and being formed, for example, by passing the wire between two wheels having meshing teeth of suitable pitch.

Figure 2:
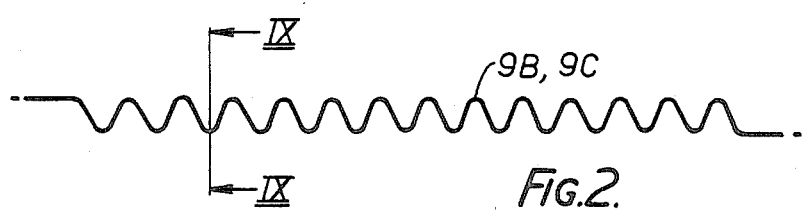

Each edge wire 9A,9B is subjected to a broadly similar process, such as by passing it between wheels having meshing teeth, but in this case the pitch and shape of the teeth are such that each edge wire 9A, 9B is formed into the configuration shown in FIG. 2 so as to be of continuous sinuous form.

The three wires 9A (of the form shown in FIG. 1), 9B (of the form shown in FIG. 2) and 9C (also of the form shown in FIG. 2) are then led to the main part of the apparatus which will now be described with reference to FIG. 3.

As shown in FIG. 3, the apparatus has a guide 40. This is in the form of a flat base plate 42 having a wide portion 42A leading integrally into a narrower portion 42B. The portion 42B is provided with side walls 44 and 46, these walls being smoothly curved outwards to the edges of the wider portion 42A. The part of the guide 40 carrying the walls 44 and 46 is covered with a top 48 shown in section in FIG. 4 but omitted from FIG. 3 to aid the explanation.

At its upstream end, the guide 40 passes immediately under the bight of two meshing toothed wheels 50 and 52 which rotate in the directions indicated.

At its downstream end, the guide is positioned immediately adjacent the entrance mouth 60 of an extruder 62.

Figure 5:
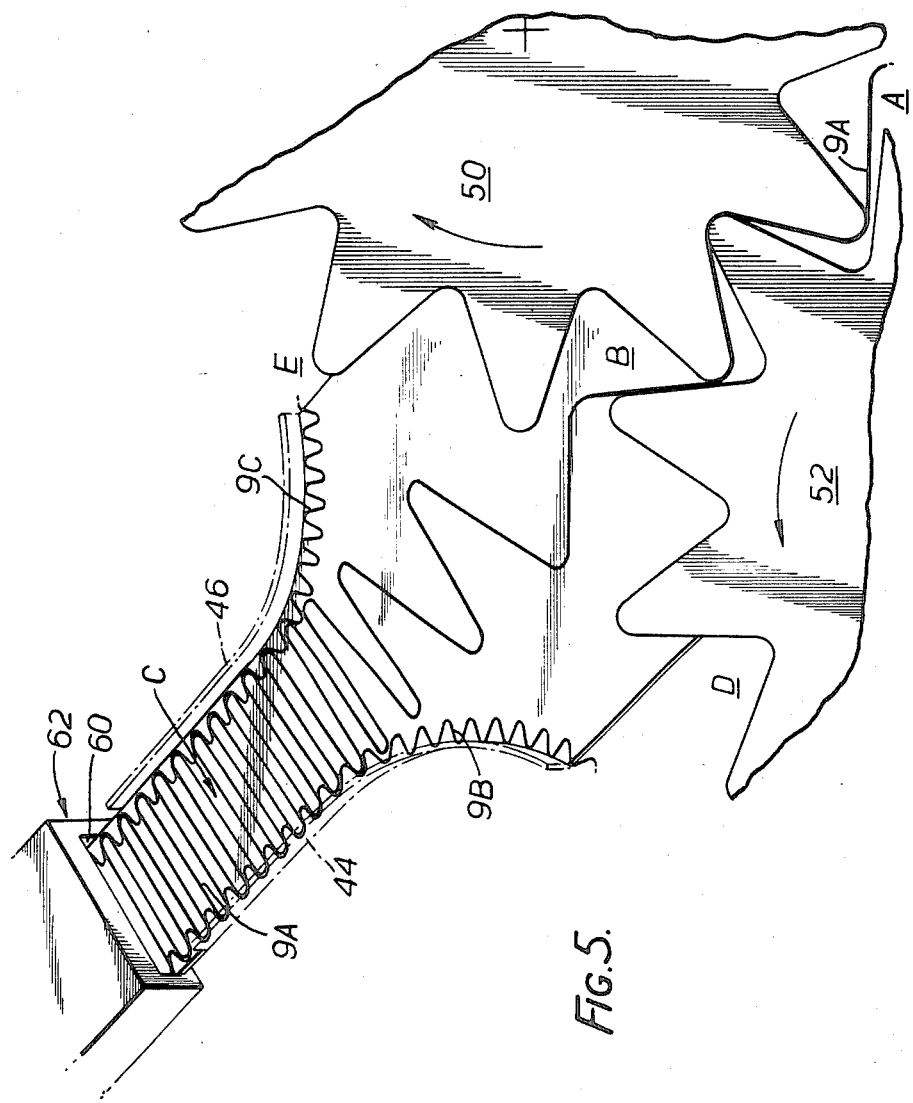
FIG. 5 corresponds to FIG. 3 but shows the apparatus in use.

The operation will now be described in more detail with reference to FIG. 5. FIG. 5 corresponds to FIG. 3 but parts of the apparatus have been omitted so as to render the wires 9A,9B and 9C more visible.

In operation, the wire 9A, having the configuration shown in FIG. 1, is fed into the bight between the wheels 50 and 52, at the position marked A in FIG. 5. The wire 9A is thus picked up by the teeth of the wheels 50,52 and fed through onto the wide section 42A of the base 42 of the guide 40. It will be apparent that the action of the teeth of the wheels 50,52 is to bend the wire 9A into zig-zag configuration. The exact zig-zag shape of the wire 9A as it emerges from the bight of the wheels 50,52 at position B is determined by the shape of the teeth of the wheels 50,52 and the lengths of their sides. The length of the sides of the teeth corresponds to the pitch between the kinks or curves in the wire 9A as shown in FIG. 1 and the wire is fed into the bight so that each change of direction of the zig-zag configuration of the wire 9A occurs at a respective curve or kink in the wire.

As the wheels 50,52 continue to turn, the wire 9A is pushed into the funnel-like entrance between the walls 44,46 the width between these walls across the narrower section 42B (FIG. 3) corresponding to the length of each side of the zig-zag configuration. As the rotating wheels 50,52 continue to feed the wire 9A onto the base plate 42 of the guide 40, the wire is pushed between the walls 44,46 and its zig-zag configuration closes up so that it assumes a looped form as shown at C in FIG. 5. Meanwhile, however, and as the main wire 9A is being fed into the guide in the manner explained above, the edge wires 9B and 9C are fed onto the wider section 42A of the base plate 42 of the guide through the openings shown at D and E. The edge wires thus slide along the curved parts of the walls 44,46 and into the mouth of the narrower part of the guide. In so doing, each edge wire "meshes" with the looped main wire 9A.

As this process continues, the meshing wires 9A, 9B and 9C are pushed into the mouth 60 of the extruder 62.

The extruder 62 is a conventional type of cross-head extruder. Plastics or rubber material is simultaneously fed into the extruder, through another entrance mouth not shown, and envelopes the meshed wires 9A,9B and 9C. The resultant assembly is forced through an appropriately shaped die opening in the extruder so that a strip of the cross-section illustrated in FIG. 6 emerges. This is in generally flat form, parts corresponding to parts of the strip shown in FIG. 7 being correspondingly referenced.

In the case where the finished strip is to be provided with the tape 14 (see FIG. 7), this tape would preferably be fed into the extruder simultaneously with the meshed wires.

Figure 6:
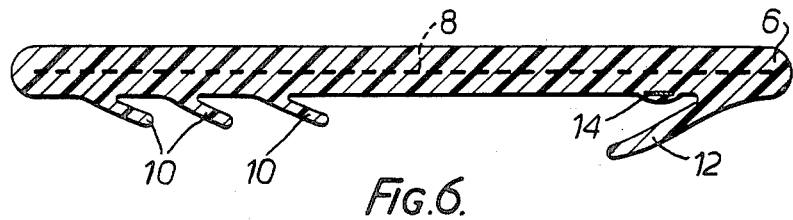
FIG. 6 shows a section through the carrier and its extruded plastics or covering material after processing by the apparatus of FIG. 3.

The flat form strip of FIG. 6 is then passed between suitably arranged rollers which cause it to be bent up into U-form so as to have the form shown in FIG. 7.

It will be apparent of course that the extruded plastics or rubber materials 6 in the strip (in the form shown in FIG. 6 as well as in the form shown in FIG. 7) ensures that the edge wires 9B and 9C of the carrier are held in mesh with the main wire 9A.

The resultant carrier 8, and the strip incorporating the carrier 8, have a number of advantages. The carrier is simple and inexpensive to make, being constructed from suitable conventional wire. Relatively complex stamping or slitting and stretching operations, which are required in the manufacture of a carrier of the type made up of U-shaped metal strip elements arranged side-by-side to define a channel, are avoided. The provision of the edge wires 9B and 9C provide good length control of the carrier. However, it is at least slightly compressible. This is advantageous because it is often desirable that the finished strip can be compressed slightly so as to take up tolerances in a peripheral length of a door opening to which it is to be fitted. The carrier will also be stretchable lengthwise to a certain extent. Such stretching can be limited or prevented by means of the tape 14 shown in FIG. 7.

In the case where the finished sealing strip is required to have a soft sealing section running longitudinally along one outside wall in the manner explained above, this can be produced by a duplex extrusion process as previously indicated, and in this case the extruder 62 (FIG. 3) would include provision for receipt of the material for producing the softer sealing section, and the die opening would be shaped accordingly.

Figures 8, 9:
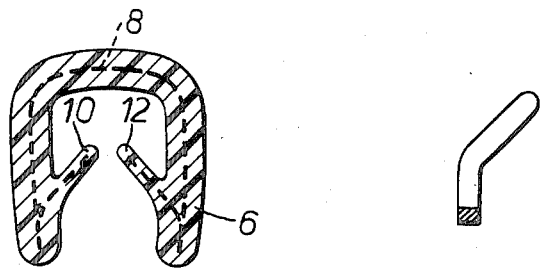
FIG. 8 is a section through a modified form which the strip of FIG. 7 can take.
FIG. 9 is a section on the line IX—IX of FIG. 2 but showing a step in a modified form of the method.
Figure 10:
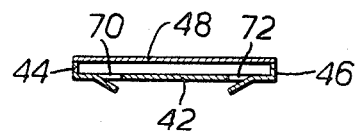
FIG. 10 corresponds to FIG. 4 but shows a modified form of the apparatus.
Figure 11:
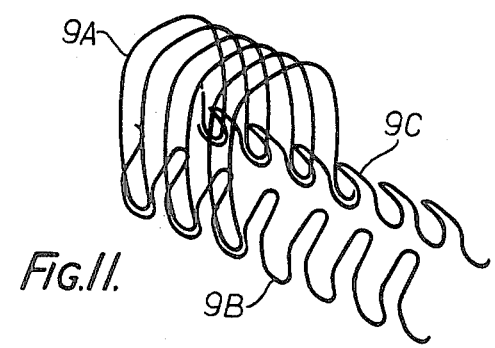
FIG. 11 is a perspective diagrammatic view showing part of the carrier included in the strip of FIG. 8.

FIG. 8 shows a cross-section through a modified form of sealing strip. In this case, there are only two gripping lips 10,12 and in each of them is embedded an appropriately configured part of the carrier 8 for reinforcing it. This could be achieved by appropriately forming the edge wires 9B, 9C. More specifically, the process which forms these wires into the configuration shown in FIG. 2 would be adapted so that each loop of the edge wire would not lie in a single plane but would be bent so as to have the configuration shown in FIG. 9 which is a section on the line IX—IX of FIG. 2. The process of manufacture would be similar to that described above with reference to FIGS. 3 and 5. However, the base plate 42 of the guide 40 would be modified so as to provide longitudinal slits 70,72 as shown in FIG. 10. The bent portions of the loops of the edge wires 9B,9C would protrude into these slits 70,72 as the edge wires are moved into meshing engagement with the looped main wire 9A (see FIG. 5). Clearly, the mouth 60 of the extruder 62 and the die therein would have to be appropriately shaped so as to permit the meshed wires, including the bent-out portions of the edge wires, to be received and to be appropriately embedded within the extruded material, so as ultimately to produce the configuration shown in FIG. 8. FIG. 11 shows a diagrammatic perspective view of part of the resultant carrier of such a strip but with all the extruded material completely removed.

If advantageous, the main wire 9A can be secured to the edge wires 9B and 9C more positively, as by means of adhesive or sewing for example.

It will be appreciated that the carriers described can be used in applications other than in channel-shaped strips, that is, as reinforcements generally. They do not have to be used in a channel-shaped configuration but could be used flat.

What is claimed is:

1. A trimming or sealing strip, comprising
   a carrier for reinforcing the strip and covering material in which the carrier is completely embedded,
   the carrier comprising a first wire looped to and fro with a predetermined pitch between lines extending alongside each other and spaced apart by a predetermined distance, and at least one second wire which is looped with substantially the same predetermined pitch, has an amplitude substantially less than the spacing between the two said lines, and is positioned along one of the said lines so as to be in meshing but non-interwoven engagement there with the loops of the first wire,
   the first and second wires being held in said meshing engagement by the covering material.

2. A strip according to claim 1, in which there is another, and substantially identical, second wire, this other second wire being positioned along the other said line so as to be in meshing but non-interwoven engagement there with the loops of the first wire, the first wire and this other second wire being held in meshing engagement by the covering material.

3. A strip according to claim 1, in which the covering material is extruded plastics or rubber material of predetermined shape.

4. A strip according to claim 1, in which each wire has a square or rectangular cross-section.

5. A strip according to claim 3, in which the said predetermined shape of the extruded plastics or rubber material is a channel shape and the carrier is of substantially the same shape with the said lines thereof being lines which together define the width of the mouth of its channel shape and in which the extruded plastics or rubber material defines at least one gripping lip which runs along the length of the channel on one inside wall thereof.

6. A strip according to claim 5, in which the said second wire is configured so that each loop thereof has a first portion in the said meshing engagement and a second portion bent relative to the first portion and embedded within the plastics or rubber material defining the said gripping lip.

7. A trimming or sealing strip of channel-shape configuration having substantially parallel spaced-apart edges defining the channel opening, comprising
   extruded plastics or rubber material defining the said channel-shape and the said edges,
   a first wire which extends continuously along the length of the channel and is looped to and fro between the said edges to form a plurality of generally U-shaped elements arranged side-by-side along the length of the channel and interconnected by the reversals of direction in the loops in the successive loops and completely embedded within the extruded material, the reversals of direction being spaced apart from each other with predetermined pitch along the length of each said edge, and
   at least one second wire which is of looped configuration of the said predetermined pitch but having a loop amplitude substantially less than the amplitude of each loop of the first wire,
   the said second wire running along the length of a respective one of the said edges and being in meshing but non-interwoven engagement with the said reversals of direction of the first wire along that edge and being held in such engagement by being embedded with the first wire in the extruded material.

8. A strip according to claim 7, including another said second wire, this other second wire being substantially identical to the first-mentioned second wire and being arranged along the other said edge and being in meshing but non-interwoven engagement with the said reversals of direction of the first wire along that edge and being held in such engagement by being embedded with the first wire and the first-mentioned second wire in the extruded material.

* * * * *